J. B. Bean,
Dental Mold.

N°. 69,615. Patented Oct. 8, 1867.

Witnesses:
Chas A. Pettit
Solon C. Kemon

Inventor
James B. Bean
By Munn & Co.
Attorneys

United States Patent Office.

JAMES B. BEAN, OF BALTIMORE, MARYLAND, ASSIGNOR TO HIMSELF AND A. H. BALDERSTON, OF SAME PLACE.

*Letters Patent No. 69,615, dated October 8, 1867.*

---

IMPROVED METHOD OF SECURING ARTIFICIAL TEETH TO CAST PLATES.

---

*The Schedule referred to in these Letters Patent and making part of the same.*

---

TO ALL WHOM IT MAY CONCERN:

Be it known that I, JAMES B. BEAN, of the city and county of Baltimore, and State of Maryland, have invented a new and improved Method of Securing Artificial Teeth to Cast Plates; and I do hereby declare the following to be a full, clear, and exact description of the same, sufficient to enable those skilled in the art to which the invention appertains to make use of it, reference being had to the accompanying drawings, forming part of this specification, in which—

Figure 1:
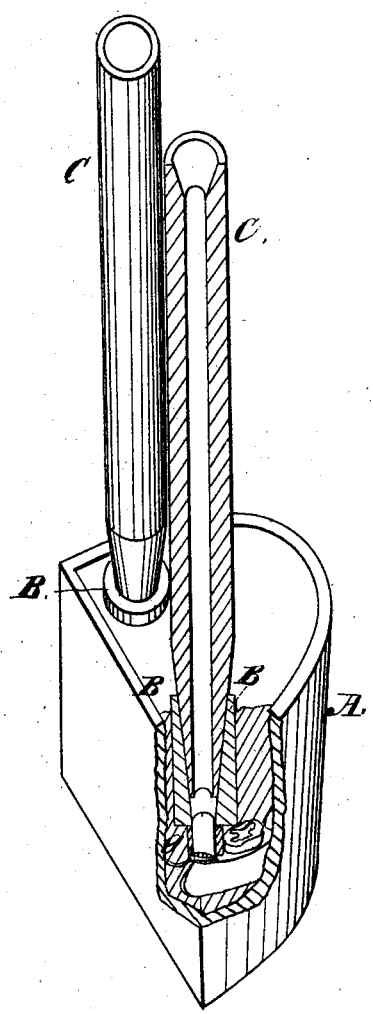
Figure 1 represents a perspective view of my invention, a portion of the flask being removed to show the interior construction and arrangement of the apparatus.

In this invention, a plate cast of aluminum or other similar metal is employed, having recesses into which the teeth are fitted. A groove is left behind the teeth, between them and the plate, into which the pins attached to the teeth project when in place. This groove, having pits or recesses along its sides, is afterwards filled with melted tin under pressure, the teeth being thus firmly secured to the plate.

Figure 2:
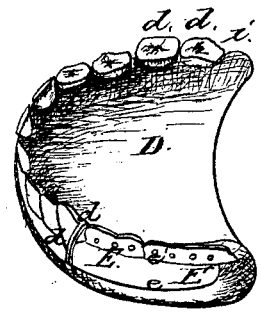
Figure 2 is a perspective view of the plate with the teeth attached.
Figure 3:
Figure 3 is a vertical cross-section of the plate and one of the teeth attached to it.

In the drawings, D represents the plate, upon which the teeth $d\ d$ are to be fixed. This plate is prepared, and the fastening of the teeth is effected in the following manner:

First, I cast a plate of aluminum, having around the line which the teeth are to cover a recess or cavity, E E. This plate, with four teeth removed to exhibit clearly its construction, is shown in fig. 2 of the drawings. It will be observed that the lower edge of this recess terminates in a deep, sharp groove, $e$, in which the necks of the teeth or thin edges of the artificial gums $d\ d$ are stopped and confined securely, being fitted close against the plate on all sides. It will also be observed that a groove, $e'\ e'$, at the upper part of the recess E E, along the line $e''\ e'''$, extends all around the plate between it and the teeth, into which the platinum pins of the teeth-blocks project. This groove has, along its sides, pits, holes, and recesses, cut or drilled into the thicker portions of the plate, and also all rough and jagged points or under cuts that can be obtained. This groove is made so deep that when the teeth are all fitted to the plate the cavity along this line is not filled up, but an empty channel remains behind the teeth running along the line of the platinum pins the whole length of the line of teeth from the point $i$ to the point $i'$.

When the plate D has been constructed in this shape, the teeth $d\ d$ are inserted in their proper places in the recess E E, and secured by running a little melted wax along the line of juncture of the teeth with the plates, completely stopping up all crevices between and around the teeth leading toward the groove $e'\ e'$ behind the teeth. Two small cylinders of wax, $g\ g$, close the two exits of the channel $i'\ i'$, and project a short distance above the teeth. The whole is now ready to be placed in the investment of pumice-stone and plaster for the permanent fastening of the teeth to the plate. This is effected in the following manner:

First, I provide myself with a flask, A, of the form shown in the drawing, fig. 1. This flask I fill about one-third full of a composition of two parts, by weight, of powdered pumice-stone, and one part of calcined plaster of Paris mixed with water, and suffered to harden.

The plate D, having the teeth fixed to it as above described, is then placed upon the layer of composition in the flask, the teeth projecting upward, and another similar portion of the same composition poured in, sufficient to completely envelop the plate and teeth, and leave the two little cylinders of wax, $g\ g$, projecting above. This layer of composition becoming hardened, the wax cylinders projecting above it are melted down even with the surface by means of a hot instrument. Two stout brass tubes, B B, of a funnel form are placed with their small ends downward, one over each of the wax cylinders $g\ g$, and, being warmed, they embed themselves in the wax. A third portion of the composition above described is now poured in, filling up the flask to near the top of the brass tubes. The two high conduits C C, of cast iron or other suitable material, about five inches in length, are made to fit into the conical cavities of the brass tubes fixed into the flask by means of a close-fitting ground joint, but so as to be easily put in or removed. The flask is now dried by a gentle heat, and heated to about the melting point of tin. The wax being melted is entirely absorbed from around the teeth by the surrounding composition. The wax cylinders $g\ g$ likewise disappear, and an open channel now remains, running from the bottom of one tube, B, around back of the teeth, connecting with all the minute interstices between and behind the teeth, to the bottom of the tube B, over the other extremity of the plate. The brass tubes B B are now exposed to the heat, so as to be somewhat above the temperature of the remainder of the flask, and the conduits C C are heated almost to redness, and dropped into their places in B B, fig. 1. Pure tin, heated to about the temperature at which olive oil takes fire, is now poured into one of the conduits. The metal thus poured into the conduit flows down through the empty channel $e''$ $e''$, and up into the other conduit. The first conduit is kept full, and as soon as the metal appears in the second, it also is filled to the top by pouring the metal into it. As soon as both conduits are full, a wet cloth is applied to the outside of the flask A, so as to cool its contents first, while the pressure is kept up by the fluid metal in the conduits. If the metal in the conduits were first cooled, that in the groove $e$ $e$ would all be drawn out to supply the deficiency caused by the shrinking, while, by cooling the groove first, the final shrinkage takes place in the conduits, and we find the metal has been forced into every minute pore and crevice between and around the teeth and platinum pins, and into the pits, under cuts, and retaining points along the channel $e$ $e$, thereby most effectually securing the teeth to the plate. As soon as the whole apparatus has sufficiently cooled, the composition is carefully removed from around the teeth, the plate, with the conduits attached, removed from the flask, and the gates cut off at the bottom of the brass tubes B B. The brass tubes can now be removed from the conduits, and the metal melted out of the latter.

I have been for a long time experimenting with this process, and can say that with anything like reasonable care in conforming to the directions above given, the success of the operation will be uniform and perfect. The teeth thus fastened to the plate are attached as perfectly as if they were a part of the metallic plate itself, and the work is more easily repaired than any other kind in use. Should the teeth become injured or broken, they may be removed from the plate, and by supplying the broken portion with a new block from the same mould, and repeating the operation above described, it is rendered as perfect as before the injury. The same process can also be used for securing the teeth to lower sets cast in solid gold or silver, thereby securing weight in a lower set, which is as great a desideratum as lightness is in an upper set.

Having thus described my invention, what I claim as new, and desire to secure by Letters Patent, is—

1. The dental plate, cast of aluminum or other similar metal, having the recesses E E and the channel $e''$ $e''$, behind the teeth when they are in position, substantially as described.

2. I claim the process, above described, of forcing melted tin or other metal around the teeth and platinum pins, as and for the purpose specified.

3. I claim the use of melted tin for the purpose of filling the channel or cavity $e''$ $e''$, and attaching the teeth having platinum pins, as for vulcanite work, to a metallic plate, as and for the purpose herein shown and described.

JAS. B. BEAN.

Witnesses:
JAMES H. GRIDLEY,
SOLON C. KEMON.